June 12, 1923.
F. WILLE
TESTING MACHINE
Filed Aug. 5, 1921
1,458,259
2 Sheets-Sheet 1
FIG. I.
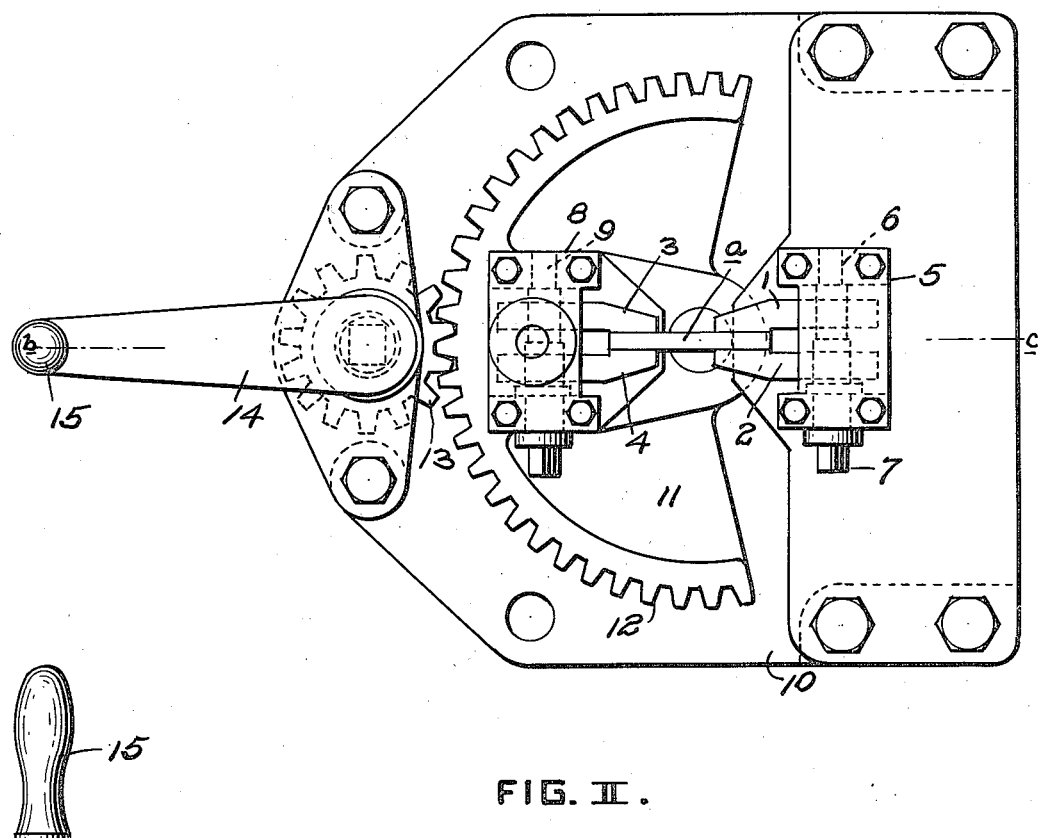
FIG. II.
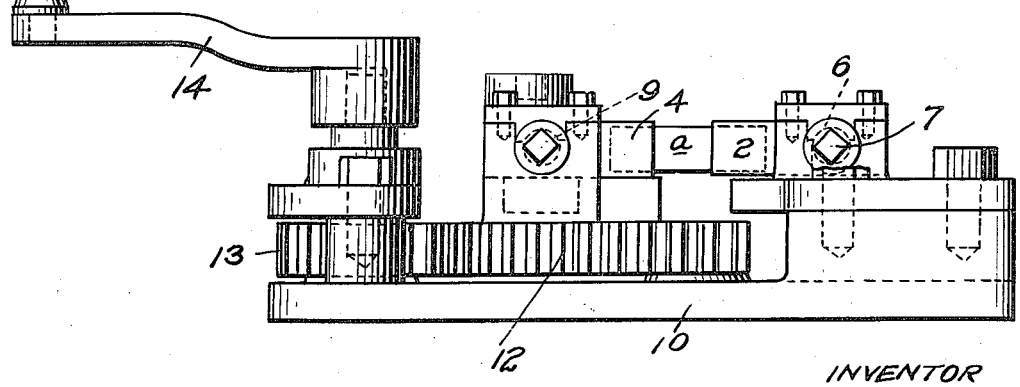
WITNESSES
INVENTOR
Frederick Wille
by Christy and Christy
his attorneys

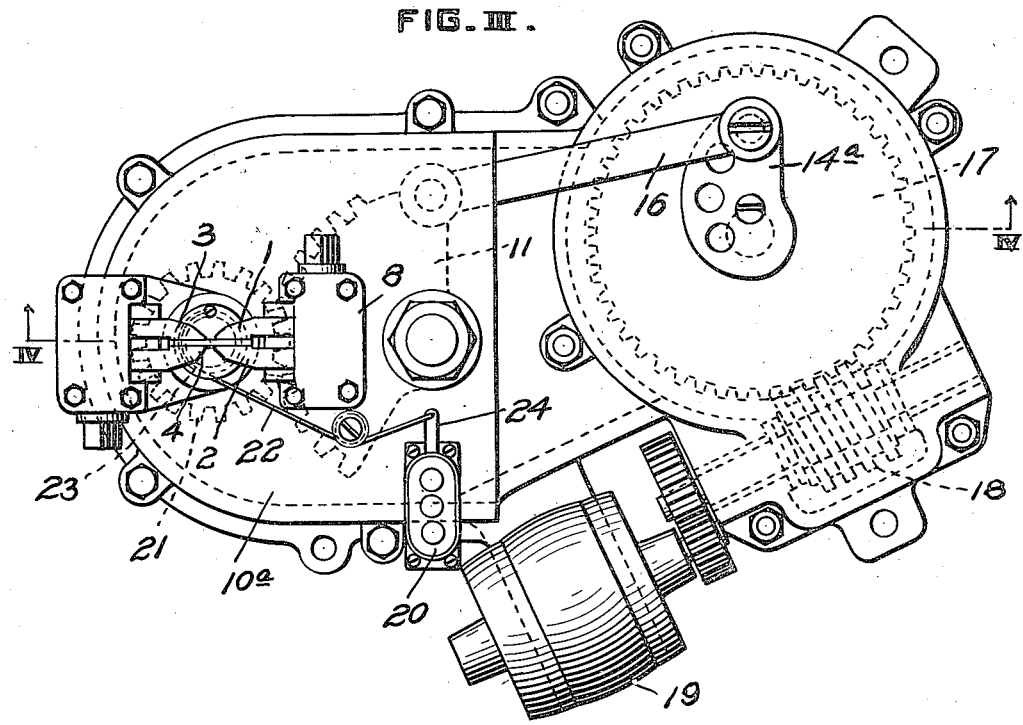
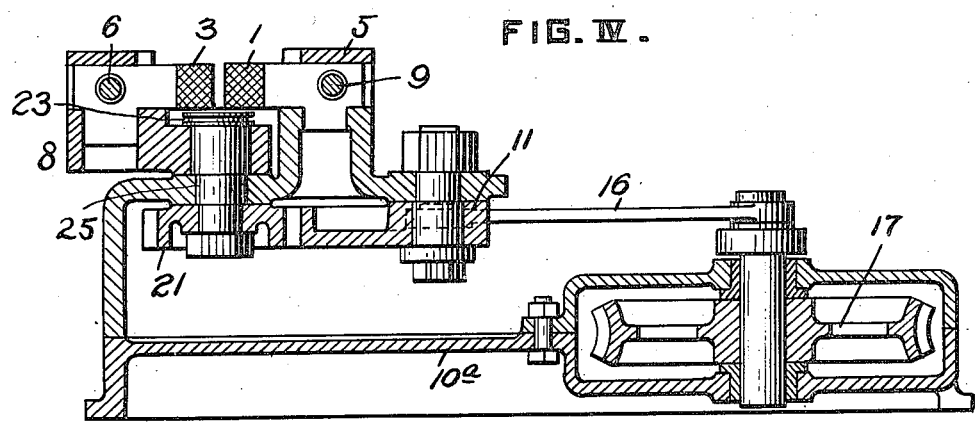

Patented June 12, 1923.

1,458,259

UNITED STATES PATENT OFFICE.

FREDERICK WILLE, OF WARREN, OHIO, ASSIGNOR TO THE TRUMBULL STEEL COMPANY, OF WARREN, OHIO, A CORPORATION OF OHIO.

TESTING MACHINE.

Application filed August 5, 1921. Serial No. 490,018.

*To all whom it may concern:*

Be it known that I, FREDERICK WILLE, residing at Warren, in the county of Trumbull and State of Ohio, a citizen of the United States, have invented or discovered certain new and useful Improvements in Testing Machines, of which improvements the following is a specification.

My invention relates to machinery for testing the physical properties of metal articles, and consists in a machine for bending such material as steel strip. It will of course be understood that it is applicable, for performing a bending test upon any elongate bodies formed of various materials, but it is particularly suitable for performing such test upon metal strips, rods, wires, and the like.

The invention is illustrated in the accompanying drawings. Figs. I and II are views in plan from above and in side elevation of a hand-operable bending machine embodying my invention. Figs. III and IV are views in plan from above and in vertical section of a power-driven machine, embodied in which the same invention will be found. The plane of section of Fig. IV is indicated by the broken line IV—IV, Fig. III.

The machine consists essentially of two pairs of oppositely placed jaws, adapted to engage at properly spaced points the article to be tested, and movable the one relatively to the other, in such manner and to such extent as to effect the desired flexure.

In Fig. I the jaws which constitute the two pairs are indicated at 1, 2 and 3, 4, and between them a piece of work, *a*, is shown to be clamped. As here shown, the two pairs of jaws stand in relative position of inactivity, in which the engaged piece of work is under no strain of flexure, and here it will be observed that the meeting faces of the individual jaws extend in vertical planes, and that the jaws of the two pairs open and close from and toward a common medial plane,—a vertical plane, on the line *b—c*. The bending strain is imposed upon the material by moving one pair of jaws transversely, in a direction substantially perpendicular to that common medial plane.

The pair of jaws 1 and 2 open and close to engage and release a piece of work, by being mounted in a common housing 5, within which housing one (or it may be both) of the jaws is moved by virtue of screw-threaded engagement with a rotatable bolt 6. Bolt 6 makes endwise bearing upon the housing, and is provided with a wrench-seat 7, to facilitate turning. Similarly, jaws 3 and 4 are borne in a housing 8, and are opened and closed through the instrumentality of a bolt 9.

One of the two housings is movable; both might be, but ordinarily it will suffice to move but one. Accordingly housing 5 is in this case bolted to a bed plate 10, and housing 8 alone is movable. Explanation remains to be given of the movement of this housing 8.

As has been said, movement is in a direction substantially perpendicular to the plane indicated at *b—c*. The movement preferably is such that the distance between the two pairs of jaws does not increase, as movement takes place from the non-bending position shown in Fig. I, but rather decreases. Particularly when dealing with material of appreciable thickness, this distance should ordinarily diminish. The preferable arrangement is that shown in the drawings; housing 8 is mounted on a turntable 11, pivoted in bed-plate 10 on a vertical axis lying within the plane *b—c*. This axis is remote a substantial distance from the edges of jaws 3, 4; to the right of jaws 3, 4 (as seen in Fig. I); and preferably (as shown) is in its position intermediate between the edges of jaws 3, 4 and the edges of jaws 1, 2, and closely adjacent to the edges of jaws 1, 2. The distance measured on the line *b—c* from the edges of jaws 1, 2 to the center of turning of table 11 will be nicely determined, according to the thickness of the material to be treated. If the center of turning coincided exactly with the edges of the jaws, manifestly the distance between the opposite pairs of jaws would be constant, throughout the range of turning of table 11.

Turning movement may be imparted to turntable 11 in any suitable manner. In Figs. I and II I show the table to be provided along a circular edge with pinion teeth 12, and with these teeth a pinion 13 meshes. Pinion 13 is journalled on a vertical axis in a suitable housing borne by bedplate 10. Means are provided for turning pinion 13, and in the particular machine here shown these means consist of a crank 14 with a handle 15 applicable to the axle of pinion 13.

The machine of Figs. III and IV is in all essential features identical with that of Figs. I and II already described, so far as concerns the structure and mounting of the claims. There are two features of the machine of Figs. III and IV which require further explanation. Referring again for a moment to Figs. I and II, it is a matter of obvious recognition that in operation the turntable is to be swung back and forth in oscillatory manner through an arc of limited extent; and that in order to effect such reciprocation crank 14 will be turned first in one direction and then in the other. Now in the machine of Figs. III and IV turntable 11 is linked to a crank 14ª by a link 16, in such manner that continued rotation in uniform direction of the axle which carries the crank will effect the desired reciprocatory or oscillatory movement of the turntable. And it will further be observed, on comparing these several means of effecting oscillation, that, in the case of the machine of Figs. I and II, the degree of oscillation—the angular range of table turning—is variable, being determined by the will of the operator; whereas in case of the machine of Figs. III and IV, the angular range of table oscillation is predetermined, mechanically achieved, and when the parts are adjusted, is invariable. It is, however, further to be remarked, as is clearly indicated in Fig. III, that the link 16 may be pivoted to crank 14ª at one or another of a plurality of points. Thus the effective length of the crank may be initially fixed to afford a bend of say 45°, 90°, 135°, or 180° as, may be desired. The possibility of adjustment just alluded to is found in the plurality of holes formed in crank 14ª for the pivoting to it of link 16. These holes are arranged at different distances from the center of turning, and according as the link 16 is pivoted through one or another of these holes the range of oscillation will be determined at one or another degree.

The machine of Figs. III and IV includes a second feature, distinguishing it from the machine of Figs. I and II. Crank 14ª might be manually turned, in like manner as crank 14 of Figs. I and II is turned. As a matter of fact, however, this machine is power-driven. The axle which carries crank 14ª is the axle of a pinion wheel 17, and with this pinion wheel a worm 18 meshes; this worm is carried on a shaft driven from an electric motor 19. Motor, shafts, and pinion wheel, are all of them conveniently mounted on the bed-plate 10ª of the machine. The motor in operation manifestly effects the desired oscillation of turntable 11.

The machine of Figs. III and IV contains this further incidental feature of difference,—the sector-shaped member 11 is not a turntable, for it carries nothing; it is merely a power-transmitting member. Linked to crank 14ª on one hand, it meshes on the other hand with a pinion 21. Housing 8 which carries jaws 3 and 4 is itself carried integrally on a vertical shaft 25 journalled in the bed of the machine, and with this shaft pinion 21 is functionally integral. Housing 5 is anchored in the bed of the machine.

Incidentally, Figs. III and IV show a tally, for recording the number of reciprocations of the turntable—that is to say, the number of flexures imposed upon the article under test as operation of the machine progresses. The tally is indicated at 20. A cord 22 connects a drum 23 which is borne integrally on shaft 25 with the operating lever 24 of the tally. With each reciprocation of table 11 drum 23 is turned, first in one direction and then in the other, and, with every second turning of the drum, lever 24 is drawn aside and the tally operated.

Operation is plain. The clamps being in the position indicated in Fig. I, the jaws are opened, a piece of material, such as $a$ is introduced, and the jaws are closed upon it. Oscillation of turntable 11 follows, and as the table oscillates the piece of material under test is bent oppositely, first in one direction and then in the other. The degree of bending necessary to effect breakage may, with some materials, be a criterion of quality. Ordinarily the criterion will be the number of flexures of predetermined degree necessary to effect rupture. If a tally be present, the number of flexures will be automatically recorded.

I claim as my invention:

1. In a machine for subjecting material to a bending test, the combination of two clamping devices mounted on a suitable foundation and spaced apart at an interval one from the other and adapted to receive undistorted an article introduced simultaneously into both, said clamping devices being mounted so as to be movable, one relatively to the other, in a direction transverse to a length of material held undistorted between them, means for effecting such relative movement without increasing the distance between the clamping devices.

2. In a machine for subjecting material to a bending test the combination of two clamping devices mounted on a suitable foundation and spaced apart at an interval one from the other and adapted to receive undistorted an article introduced simultaneously into both, said clamping devices being mounted so as to be movable, one relatively to the other, in a direction transverse to a length of material held undistorted between them, and means for effecting such relative movement with diminution of the distance between the clamping devices.

3. In a machine for subjecting material to a bending test, the combination of a pair of clamping devices mounted on a suitable foundation and standing normally opposite and in alignment one with the other, one of said clamping devices being revoluble from normal position about a center lying between the two when standing in normal position.

In testimony whereof I have hereunto set my hand.

FREDERICK WILLE.

Witnesses:
    EDGAR P. HULSE,
    H. L. BAILEY.